J. B. WARNER.
Friction-Clutch for Loose and Tight Pulleys.
No. 202,312. Patented April 9, 1878.
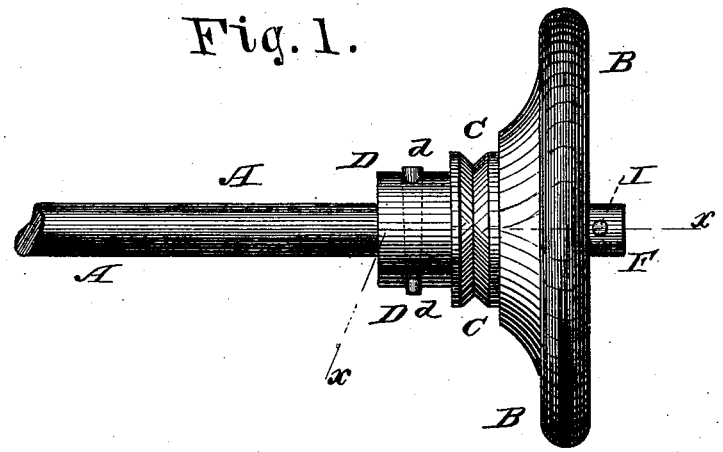
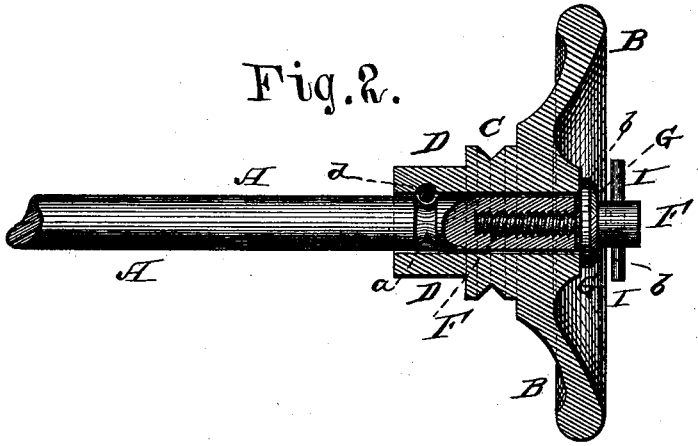

UNITED STATES PATENT OFFICE.

JAMES B. WARNER, OF HAGERSTOWN, MARYLAND, ASSIGNOR TO HIMSELF AND GEORGE SHARER, OF SAME PLACE.

IMPROVEMENT IN FRICTION-CLUTCHES FOR LOOSE AND TIGHT PULLEYS.

Specification forming part of Letters Patent No. 202,312, dated April 9, 1878; application filed March 27, 1878.

*To all whom it may concern:*

Be it known that I, JAMES B. WARNER, of Hagerstown, in the county of Washington and State of Maryland, have invented certain new and useful Improvements in Clutches or Loose and Tight Pulleys for Sewing-Machines; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to sewing-machines; and it consists in the construction and arrangement of a clutch or loose and tight pulley for the same, as will be hereinafter more fully set forth.

In the annexed drawings, to which reference is made, and which fully illustrate my invention, Figure 1 is a side elevation of my invention. Fig. 2 is a longitudinal section of the same on the line $x$ $x$, Fig. 1.

A represents the main shaft of a sewing-machine, having the fly-wheel B thereon. This fly-wheel is formed with the belt-pulley C and elongated hub D, as shown.

In the shaft A, inside the hub D, is made a circumferential groove, $a$; and a pin, $d$, is passed tangentially through the hub, and lying in the groove $a$, filling the same on one side, so as to prevent any lateral movement of the fly-wheel upon the shaft, and yet allow the fly-wheel to turn on the shaft when desired.

The groove $a$ is at such a distance from the end of the shaft that when the fly-wheel is put on and confined by the pin $d$, as described, the end of the shaft will not reach clear to the face of the hub of the wheel, but leave a small vacancy, as shown at $b$ in Fig. 2.

F represents a left-handed screw, provided with a flange, G, and through its head is passed a pin, I, to form a handle for turning the screw. This screw is screwed into the end of the shaft A, and the flange G will come in contact with the hub of the fly-wheel without touching the end of the shaft, and hence, by tightening the screw, said flange will, in connection with the pin $d$ in the groove $a$, make the wheel fast upon the shaft, so that for operating the sewing-machine the shaft will turn with the wheel.

By simply slightly loosening the screw I the wheel becomes loose and will revolve on the shaft, which then remains stationary. This is of great importance in sewing-machines, as the operator can wind a bobbin at any time without removing the work from the machine, and without running the operative works of the machine.

Having thus fully described my invention, what I claim as new, and desire to secure by Letters Patent, is—

1. In combination with a sewing-machine shaft, A, and a fly-wheel, B, with devices, as described, for preventing lateral motion of the wheel on the shaft, a screw, F, provided with flange G, for locking the wheel on and unlocking it from the shaft, substantially as herein set forth.

2. The combination of the shaft A, with circumferential groove $a$, the fly-wheel B, with pulley C and hub D, the pin $d$, and the screw F, with flange G, all constructed substantially as and for the purposes herein set forth.

In testimony that I claim the foregoing as my own I have hereto affixed my signature in presence of two witnesses.

JAMES B. WARNER.

Witnesses:
C. H. WATSON,
A. HUFFER.